Figure 1:
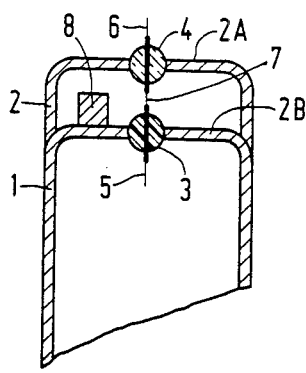

United States Patent [19]

Voorn

[11] Patent Number: 4,761,351
[45] Date of Patent: Aug. 2, 1988

[54] BATTERY COMPRISING ONE OR MORE ELECTROCHEMICAL CELLS HAVING A DOUBLE-WALLED CELL LID

[75] Inventor: Gijsbertus Voorn, Eindhoven, Netherlands

[73] Assignee: U.S. Philips Corp., New York, N.Y.

[21] Appl. No.: 26,796

[22] Filed: Mar. 17, 1987

[30] Foreign Application Priority Data

Mar. 21, 1986 [NL] Netherlands ................ 8600729

[51] Int. Cl.⁴ ............................................. H01M 2/32
[52] U.S. Cl. ....................................... 429/50; 429/65; 429/163; 429/177; 429/180
[58] Field of Search ............... 429/177, 179, 180, 181, 429/184, 185, 171, 173, 194, 86, 50, 61, 65, 163, 49

[56] References Cited

U.S. PATENT DOCUMENTS

| | | | |
|---|---|---|---|
| 2,452,066 | 10/1948 | Murphy | 429/177 X |
| 3,457,117 | 7/1969 | Angelovich | 429/177 X |
| 4,303,745 | 12/1981 | Anderson et al. | 429/86 |
| 4,350,745 | 9/1982 | Parsen et al. | 429/86 X |
| 4,598,466 | 7/1986 | Arenas et al. | 429/180 X |

Primary Examiner—Anthony Skapars
Attorney, Agent, or Firm—Ernestine Bartlett

[57] ABSTRACT

A battery of one or more electrochemical cells comprises in a metal cell box having a metal double-walled cell lid with a leadthrough of an electrically insulating material and a leadthrough pin, which lid is sealed hermetically to said box, a negative electrode of an alkali metal, a positive electrode and an electrolyte which comprises a corrosive constituent. The cell lid has such a shape that a chamber is formed which is sealed from the ambient. Both walls have a leadthrough of an electrically insulating material and a leadthrough pin.

13 Claims, 1 Drawing Sheet

BATTERY COMPRISING ONE OR MORE ELECTROCHEMICAL CELLS HAVING A DOUBLE-WALLED CELL LID

The invention relates to a battery of one or more electrochemical cells comprising in a metal cell container having a metal cell lid with a leadthrough of an electrically insulating material and a leadthrough pin, which lid is sealed hermetically to said container, a negative electrode of an alkali metal, a positive electrode and an electrolyte which comprises a corrosive constituent.

A known battery of this type comprises one or more cells having a negative electrode of lithium, a positive electrode of nickel or carbon, and an electrolyte the solvent of which consists entirely or partly of thionyl chloride or another oxyhalide. The solvent may alternatively be an organic solvent. The solvent and/or the substances dissolved therein, for example, complexes of lithium salts, depolarizers such as halogen complexes, may have a corrosive influence on the leadthrough material. Leadthrough material may be, for example, glass, ceramic or an organic polymer material, for example teflon.

For a number of applications there is the need for batteries which have a guaranteed storage stability for a longer period of time, which can operate in a temperature range between approximately $-40°$ C. and $+63°$ C., and which can be stored at temperature between approximately $-55°$ C. and $+72°$ C.

These requirements can be satisfied at any rate only by hermetically sealed cells. One of the problems with these cells is the corrosion of the leadthrough material by the electrolyte and/or the substances dissolved therein. This corrosion may be delayed by a suitable choice of the composition of the leadthrough material, but it cannot be suppressed entirely. Once the corrosion of the leadthrough material has made such a progress that the cell contents are in open communication with the atmosphere first via a capillary, the corrosion can make rapid progress. This is caused by the evaporation of the solvent and the capillary attraction of electrolyte into the capillary. If the solvent in itself is corrosive or comprises a corrosive constituent, electronic and electrical components in the surroundings of the battery can be corroded to such an extent that after some time they no longer operate in the desired manner. Moreover, the battery action decreases due to the loss of solvent (desiccation).

It is an object of the invention to achieve a prolonged life of batteries of the type mentioned in the opening paragraph.

According to the invention, this object is achieved by means of a battery of the type described which is characterized in that the cell lid has a double-walled construction in which a space which is sealed from the ambient is formed, both walls comprising a leadthrough of electrically insulating material and a leadthrough pin.

The invention is based on the recognition of the fact that if corrosion cannot be prevented definitely, an extension of life can nevertheless be reached by suppressing the capillary rising of the electrolyte in the capillary formed in the corrosion by producing above the capillary a vapour pressure of the electrolyte solvent which corresponds to the vapour pressure of the electrolyte solvent at the ambient temperature.

In the construction according to the invention this can be achieved by giving the cell lid with leadthrough a double-walled construction in which a chamber is formed which is sealed from the atmosphere.

The sealed chamber is preferably filled with a gas, for example, air, nitrogen or the like, which does not corrode the metal of the cell lid. It has been found that a vapour pressure of the solvent need be built up only after a capillary has formed in the leadthrough between the chamber and the cell contents. Said vapour pressure is then built up by the electrolyte solvent itself seeping through the capillary.

According to another embodiment of the invention an electrolyte-absorbing and/or neutralizing material may be present in the chamber. The neutralizing material preferably consists of a substance which upon reaction with the electrolyte forms a gas, for example, ammonium carbonate and ammonium bicarbonate or an alkali carbonate or alkali bicarbonate. As a result of this an extra gas pressure is formed in the chamber which forces back the capillary rise of the electrolyte solvent.

The leadthrough provided in the double-walled lid may consist of various materials and combinations of materials. The specific advantages of a number of possible combinations will not be described.

The wall of the cell lid which is in direct contact with the contents of the cell has a leadthrough of a synthetic resin material, the outer wall has a leadthrough of glass.

In a cell having an electrode of lithium corrosion by lithium cannot occur as is possible in a glass leadthrough under reduction the electric resistance. Such a reduction of the electric resistance in a glass leadthrough may lead to premature self-discharge.

The glass leadthrough in the outer wall, which leadthrough can better withstand great temperature differences, protects the whole cell system from external influences. Possible small leakages as a result of great temperature differences on the inner leadthrough will not have a great influence on the glass leadthrough of the outer wall because only very small quantities of electrolyte can leak away from the cell.

Both walls of the lid have a leadthrough of a synthetic resin. The advantage of this construction is in particular that there is an ample choice of materials which may be used. The coefficient of expansion plays a less great role than in glass leadthroughs. This construction may be used while choosing the correct synthetic resins, both for batteries the electrolyte solvent of which is an organic solvent or is an oxyhalide.

Both walls have a glass leadthrough. This construction as such as suitable for batteries which are stored for long periods of time. The storage time can even be extended by providing the glass leadthroughs with a protective layer (for example, a coating of a synthetic resin).

The wall of the cell lid which is in direct contact with the contents of the cell has a glass leadthrough, the outer wall has a leadthrough of a synthetic resin.

Should a leakage occur in the glass leadthrough, the leadthrough of synthetic resin will prevent the electrolyte from running out into the ambient for a considerable period of time.

The glass for the glass leadthrough may consist, for example, of a calcium-barium glass, for example, Corning glass 9010, available commerically from Corning Glass Works, U.S.A.

Where a glass leadthrough has been mentioned hereinbefore, a leadthrough of a ceramic material, for example, on the basis of aluminum oxide or a glass ceramic, may equally be used. As a synthetic resin for the leadthrough of synthetic resin may be used, for example, : high-density polyethylene and polypropylene, fluorocarbon polymers (for example polytetrafluoroethylene, polyvinylidene difluoride, copolymerisates of ethylene and tetrafluoroethylene), epoxy resins and phenylformaldehyde resins.

The invention will now be described in greater detail with reference to the accompanying drawing.

The Figures in the drawing are sectional views of a part of a cell with cover

FIG. 1 with a leadthrough of synthetic resin and one of glass

Figure 2:
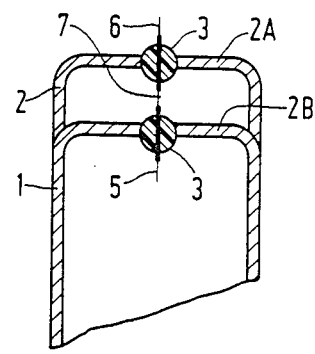

FIG. 2 with two leadthroughs of a synthetic resin

Figure 3:
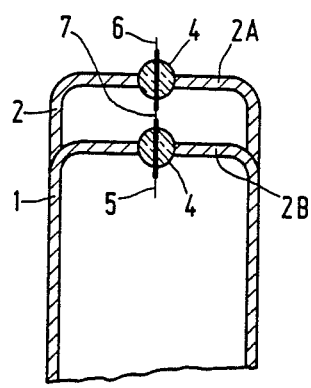

FIG. 3 with two glass leadthroughs

Figure 4:
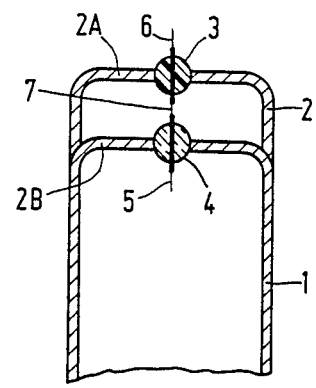

FIG. 4 with a leadthrough of glass and one of a synthetic resin.

The cell contents are not shown in the Figures.

Reference numeral 1 denotes a part of the cell wall on which a double-walled lid cover 2 has been sealed hermetically, for example, by welding. The leadthroughs are situated in the walls 2A and 2B, reference numeral 3 is always a leadthrough of a synthetic resin and reference numeral 4 a glass leadthrough. Reference numerals 5 and 6 denote the current leadthrough pins with connection wires 7. The connection wire 7 may comprise a narrowing or the like which may operate as a fuse. A glass leadthrough is to be understood to include a leadthrough of a ceramic material or a glass ceramic.

The construction according to the invention is particularly suitable for cells the anode material of which consists of lithium. The electrolyte may comprise an organic solvent or an oxyhalide, for example, thionylchloride or sulfurylchloride.

Reference numeral 8 in FIG. 1 denotes an electrolyte-absorbing and/or neutralising material.

What is claimed is:

1. A battery of one or more electrochemical cells comprising in a metal cell box having a cell lid with a leadthrough of an electrically insulating material and a leadthrough pin, which lid is hermetically sealed to said box, a negative electrode of an alkali metal, a positive electrode and an electrolyte which comprises a corrosive constituent, characterized in that the cell lid has a doublewalled construction in which a chamber is formed which is sealed from the ambient, both walls comprising a leadthrough of an electrically insulating material and a leadthrough pin.

2. A battery as claimed in claim 1, characterized in that the cell lid has a double-walled construction in which a gas-filled chamber is formed which is sealed from the ambient.

3. A battery as claimed in claim 1, characterized in that the chamber comprises an electrolyte-absorbing and/or neutralising material.

4. A battery as claimed in claim 1, in which the alkali metal is lithium; and the electrically insulating material is selected from synthetic resins, glass, ceramic, glass-ceramic materials, and combinations thereof.

5. A battery as claimed in claim 4, in which the electrically insulating material in one wall may be the same or different from the material in the other wall.

6. A device for prolonging the life of a battery having one or more electrochemical cells and comprising a double-walled cell lid, hermetically sealed to said cell, comprising spaced inner and outer walls defining a chamber which is sealed from the atmosphere, each wall comprising a leadthrough of an electrically insulating material having a leadthrough pin disposed therein and connected to a corresponding leadthrough pin in the opposite wall, said device being effective to retard the leakage of electrolyte components through said leadthrough material.

7. A device as claimed in claim 6 in which said battery comprises an alkali metal anode.

8. A device as claimed in claim 7 in which the alkali metal is lithium; the electrically insulating material is selected from synthetic resins, glass, ceramic, glass-ceramic materials and combinations thereof; and the electrically insulating material in one wall may be the same or different from the material in the other wall.

9. A method for prolonging the life of a battery having one or more electrochemical cells comprising an electrolyte with one or more corrosive constituents which comprise the steps of:
   (1) providing a battery wherein portions of electrolyte contained therein tend to rise by capillary action in one or more capillaries formed by corrosion, and
   (2) producing above said capillary or capillaries a pressure sufficient to suppress the capillary rise of electrolyte components therein.

10. A method as claimed in claim 9 wherein said pressure is produced by providing a hermetically sealed cell lid having a double-walled construction wherein spaced inner and outer walls define a chamber which is sealed from the atmosphere, each wall comprising a leadthrough of an electrically insulating material having a leadthrough pin disposed therein and connected to a corresponding leadthrough pin in the opposite wall.

11. A method as claimed in claim 10 comprising the step of producing in said chamber and above said capillary a vapor pressure of the electrolyte solvent which corresponds substantially to the vapor pressure of the electrolyte solvent outside said chamber.

12. A method as claimed in claim 10 comprising the step of filling said chamber with an electrolyte-absorbing and/or neutralizing material.

13. A method as claimed in claim 12 in which said electrolyte-absorbing and/or neutralizing material reacts with the electrolyte in said wall to form a gas.

* * * * *